United States Patent
Sippel et al.

(10) Patent No.: US 12,286,885 B1
(45) Date of Patent: Apr. 29, 2025

(54) TURBINE ASSEMBLY WITH CONFRONTING VANE AND TURBINE SHROUD SEGMENT

(71) Applicant: Rolls-Royce Corporation, Indianapolis, IN (US)

(72) Inventors: Aaron D. Sippel, Indianapolis, IN (US); David J. Thomas, Indianapolis, IN (US); Ted J. Freeman, Indianapolis, IN (US); Clark Snyder, Indianapolis, IN (US); Jeffrey A. Stone, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/528,740

(22) Filed: Dec. 4, 2023

(51) Int. Cl.
  *F01D 11/08*  (2006.01)
  *F01D 11/02*  (2006.01)
  *F01D 25/24*  (2006.01)

(52) U.S. Cl.
  CPC ............. *F01D 11/08* (2013.01); *F01D 11/02* (2013.01); *F01D 25/246* (2013.01); *F05D 2240/11* (2013.01); *F05D 2300/6033* (2013.01)

(58) Field of Classification Search
  CPC ........ F01D 11/08; F01D 25/24; F01D 25/246; F05D 2240/11; F05D 2300/6033
  See application file for complete search history.

(56) References Cited

U.S. PATENT DOCUMENTS

| | | | |
|---|---|---|---|
| 6,942,445 B2 | 9/2005 | Morris et al. | |
| 7,207,771 B2 | 4/2007 | Synnott et al. | |
| 7,217,089 B2 | 5/2007 | Durocher et al. | |
| 7,374,395 B2 | 5/2008 | Durocher et al. | |
| 7,513,740 B1 | 4/2009 | Hervy et al. | |
| 7,600,967 B2 | 10/2009 | Pezzetti, Jr. et al. | |
| 7,771,159 B2 | 8/2010 | Johnson et al. | |
| 7,901,186 B2 | 3/2011 | Cornett et al. | |
| 8,206,087 B2 | 6/2012 | Campbell et al. | |
| 8,303,245 B2 | 11/2012 | Foster et al. | |
| 8,641,371 B2 | 2/2014 | Nakamura et al. | |
| 8,651,497 B2 | 2/2014 | Tholen et al. | |
| 8,684,680 B2 | 4/2014 | Martin et al. | |
| 8,784,041 B2 | 7/2014 | Durocher et al. | |
| 8,845,285 B2 | 9/2014 | Weber et al. | |
| 8,905,708 B2 | 12/2014 | Weber et al. | |
| 9,079,245 B2 | 7/2015 | Durocher et al. | |
| 9,534,500 B2 | 1/2017 | Bouchard et al. | |

(Continued)

FOREIGN PATENT DOCUMENTS

| | | |
|---|---|---|
| EP | 1965031 A2 | 9/2008 |
| EP | 3543468 A1 | 9/2019 |
| FR | 3056636 A1 | 3/2018 |

*Primary Examiner* — David E Sosnowski
*Assistant Examiner* — Maxime M Adjagbe
(74) *Attorney, Agent, or Firm* — Barnes & Thornburg

(57) ABSTRACT

A turbine assembly adapted for use with a gas turbine engine includes a turbine shroud assembly and a turbine vane. The turbine shroud assembly includes a carrier segment arranged circumferentially at least partway around an axis and a blade track segment supported by the carrier segment to locate the blade track segment radially outward of the axis. The turbine vane is located axially forward of the turbine shroud assembly and cooperates with the turbine shroud assembly to form a tortuous flow path therebetween.

20 Claims, 3 Drawing Sheets

(56) References Cited

U.S. PATENT DOCUMENTS

| | | | |
|---|---|---|---|
| 9,708,922 B1 | 7/2017 | Davis et al. |
| 9,714,580 B2 | 7/2017 | Slavens et al. |
| 9,745,854 B2 | 8/2017 | Baldiga et al. |
| 9,759,079 B2 | 9/2017 | Sippel et al. |
| 9,863,265 B2 | 1/2018 | Stapleton |
| 9,863,323 B2 | 1/2018 | Kirtley et al. |
| 9,869,201 B2 | 1/2018 | Dyson et al. |
| 9,874,104 B2 | 1/2018 | Shapiro |
| 9,915,162 B2 | 3/2018 | Duguay |
| 9,945,484 B2 | 4/2018 | Moehrle et al. |
| 9,957,827 B2 | 5/2018 | Davis et al. |
| 9,982,550 B2 | 5/2018 | Davis |
| 9,988,919 B2 | 6/2018 | Davis et al. |
| 9,988,923 B2 | 6/2018 | Snyder et al. |
| 10,012,099 B2 | 7/2018 | Cetel et al. |
| 10,024,193 B2 | 7/2018 | Shapiro |
| 10,072,517 B2 | 9/2018 | Boeke et al. |
| 10,082,085 B2 | 9/2018 | Thomas et al. |
| 10,087,771 B2 | 10/2018 | Mcgarrah |
| 10,100,660 B2 | 10/2018 | Sippel et al. |
| 10,132,197 B2 | 11/2018 | Heitman et al. |
| 10,138,747 B2 | 11/2018 | Dev et al. |
| 10,138,750 B2 | 11/2018 | Mccaffrey et al. |
| 10,167,957 B2 | 1/2019 | Davis et al. |
| 10,202,863 B2 | 2/2019 | Davis et al. |
| 10,265,806 B2 | 4/2019 | Cui et al. |
| 10,281,045 B2 | 5/2019 | Sippel et al. |
| 10,301,955 B2 | 5/2019 | Vetters et al. |
| 10,301,960 B2 | 5/2019 | Stapleton et al. |
| 10,378,385 B2 | 8/2019 | Tesson et al. |
| 10,378,386 B2 | 8/2019 | Roussille et al. |
| 10,415,426 B2 | 9/2019 | Quennehen et al. |
| 10,415,427 B2 | 9/2019 | Quennehen et al. |
| 10,422,241 B2 | 9/2019 | Mccaffrey et al. |
| 10,428,688 B2 | 10/2019 | Quennehen et al. |
| 10,428,953 B2 | 10/2019 | Lutjen et al. |
| 10,443,419 B2 | 10/2019 | Thomas et al. |
| 10,443,420 B2 | 10/2019 | Sippel et al. |
| 10,465,545 B2 | 11/2019 | Cetel et al. |
| 10,533,446 B2 | 1/2020 | Barak et al. |
| 10,550,706 B2 | 2/2020 | Lutjen et al. |
| 10,577,963 B2 | 3/2020 | Mccaffrey |
| 10,577,977 B2 | 3/2020 | Baucco |
| 10,584,605 B2 | 3/2020 | Sippel et al. |
| 10,590,803 B2 | 3/2020 | Quennehen et al. |
| 10,598,045 B2 | 3/2020 | Tableau et al. |
| 10,605,120 B2 | 3/2020 | Quennehen et al. |
| 10,619,517 B2 | 4/2020 | Quennehen et al. |
| 10,626,745 B2 | 4/2020 | Roussille et al. |
| 10,633,994 B2 | 4/2020 | Barker |
| 10,648,362 B2 | 5/2020 | Groves, II et al. |
| 10,655,495 B2 | 5/2020 | Groves, II et al. |
| 10,655,501 B2 | 5/2020 | Lepretre et al. |
| 10,662,794 B2 | 5/2020 | Das |
| 10,689,998 B2 | 6/2020 | Stapleton et al. |
| 10,690,007 B2 | 6/2020 | Quennehen et al. |
| 10,704,404 B2 | 7/2020 | Shi et al. |
| 10,718,226 B2 | 7/2020 | Vetters et al. |
| 10,724,399 B2 | 7/2020 | Carlin et al. |
| 10,731,494 B2 | 8/2020 | Dev et al. |
| 10,731,509 B2 | 8/2020 | Correia et al. |
| 10,738,643 B2 | 8/2020 | Mccaffrey et al. |
| 10,753,221 B2 | 8/2020 | Barker et al. |
| 10,787,924 B2 | 9/2020 | Quennehen et al. |
| 10,794,204 B2 | 10/2020 | Fitzpatrick et al. |
| 10,801,345 B2 | 10/2020 | Clum et al. |
| 10,801,349 B2 | 10/2020 | Mccaffrey |
| 10,815,807 B2 | 10/2020 | Vantassel et al. |
| 10,815,810 B2 | 10/2020 | Barker et al. |
| 10,830,357 B2 | 11/2020 | Mccaffrey et al. |
| 10,890,079 B2 | 1/2021 | Propheter-Hinckley et al. |
| 10,907,487 B2 * | 2/2021 | Zurmehly | F01D 9/04 |
| 10,907,501 B2 | 2/2021 | Filippi et al. |
| 10,934,872 B2 | 3/2021 | Tableau et al. |
| 10,934,873 B2 | 3/2021 | Sarawate et al. |
| 10,968,761 B2 | 4/2021 | Barker et al. |
| 10,968,777 B2 | 4/2021 | Propheter-Hinckley et al. |
| 10,982,559 B2 | 4/2021 | Filippi |
| 11,002,144 B2 | 5/2021 | Azad et al. |
| 11,015,613 B2 | 5/2021 | Kerns et al. |
| 11,021,988 B2 | 6/2021 | Tableau et al. |
| 11,021,990 B2 * | 6/2021 | Filippi | F01D 11/005 |
| 11,028,720 B2 | 6/2021 | Tableau et al. |
| 11,041,399 B2 | 6/2021 | Lutjen et al. |
| 11,047,245 B2 | 6/2021 | Mccaffrey |
| 11,066,947 B2 | 7/2021 | Sippel et al. |
| 11,073,045 B2 | 7/2021 | Sippel et al. |
| 11,078,804 B2 | 8/2021 | Tableau et al. |
| 11,085,316 B2 | 8/2021 | Barker et al. |
| 11,085,317 B2 | 8/2021 | Johnson et al. |
| 11,105,215 B2 | 8/2021 | Roy Thill et al. |
| 11,111,794 B2 | 9/2021 | Bitzko et al. |
| 11,111,802 B2 | 9/2021 | Propheter-Hinckley et al. |
| 11,111,822 B2 | 9/2021 | Tableau et al. |
| 11,111,823 B2 | 9/2021 | Jarrossay et al. |
| 11,125,096 B2 | 9/2021 | Clark et al. |
| 11,125,098 B2 | 9/2021 | Barker et al. |
| 11,143,050 B2 | 10/2021 | Roy Thill et al. |
| 11,149,574 B2 | 10/2021 | Laroche |
| 11,174,747 B2 | 11/2021 | Roy Thill et al. |
| 11,174,795 B2 | 11/2021 | Lutjen et al. |
| 11,181,006 B2 | 11/2021 | Smoke et al. |
| 11,187,094 B2 | 11/2021 | Feldmann et al. |
| 11,215,064 B2 | 1/2022 | Arbona et al. |
| 11,215,065 B2 | 1/2022 | Starr et al. |
| 11,215,081 B2 | 1/2022 | Schilling et al. |
| 11,248,480 B2 | 2/2022 | Thirumalai et al. |
| 11,255,208 B2 | 2/2022 | Clark et al. |
| 11,255,209 B2 | 2/2022 | Clark et al. |
| 11,286,812 B1 | 3/2022 | Freeman et al. |
| 11,313,242 B2 | 4/2022 | Cetel et al. |
| 11,319,827 B2 | 5/2022 | Clark et al. |
| 11,319,828 B1 | 5/2022 | Freeman et al. |
| 11,326,463 B2 | 5/2022 | Blaney et al. |
| 11,326,470 B2 | 5/2022 | Dyson et al. |
| 11,346,237 B1 | 5/2022 | Freeman et al. |
| 11,346,251 B1 | 5/2022 | Freeman et al. |
| 11,365,635 B2 | 6/2022 | Read et al. |
| 11,441,434 B2 | 9/2022 | Danis et al. |
| 11,441,441 B1 | 9/2022 | Freeman et al. |
| 11,466,585 B2 | 10/2022 | Arbona et al. |
| 11,466,586 B2 | 10/2022 | Sippel et al. |
| 11,499,444 B1 * | 11/2022 | Freeman | F01D 11/08 |
| 11,506,085 B2 | 11/2022 | Jarrossay et al. |
| 11,542,825 B2 | 1/2023 | Hauswirth et al. |
| 11,542,827 B2 | 1/2023 | Quennehen et al. |
| 11,624,291 B2 | 4/2023 | Roy Thill et al. |
| 11,624,292 B2 | 4/2023 | Clark et al. |
| 11,629,607 B2 | 4/2023 | Freeman et al. |
| 11,643,939 B2 | 5/2023 | Stoyanov et al. |
| 11,702,948 B2 | 7/2023 | Hock et al. |
| 11,702,949 B2 | 7/2023 | Freeman et al. |
| 11,713,694 B1 | 8/2023 | Freeman et al. |
| 11,732,604 B1 | 8/2023 | Freeman et al. |
| 11,761,351 B2 | 9/2023 | Freeman et al. |
| 11,773,751 B1 | 10/2023 | Freeman et al. |
| 11,781,440 B2 | 10/2023 | Vincent et al. |
| 11,781,448 B1 | 10/2023 | Holleran |
| 11,840,930 B2 | 12/2023 | Propheter-Hinckley et al. |
| 11,840,936 B1 | 12/2023 | Freeman et al. |
| 11,879,349 B2 | 1/2024 | Schilling et al. |
| 2023/0184124 A1 | 6/2023 | Stoyanov et al. |
| 2023/0332506 A1 | 10/2023 | Freeman et al. |
| 2024/0003267 A1 | 1/2024 | Cazin et al. |

* cited by examiner

TURBINE ASSEMBLY WITH CONFRONTING VANE AND TURBINE SHROUD SEGMENT

FIELD OF DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional arrangements may present problems due to thermal expansion and/or material properties of the ceramic matrix composite components.

SUMMARY

The present disclosure may comprise one or more of the following features and combinations thereof.

A turbine assembly adapted for use with a gas turbine engine may include a turbine shroud assembly and a turbine vane. The turbine vane may be located axially forward of the turbine shroud assembly.

In some embodiments, the turbine shroud assembly may include a carrier segment made of metallic materials and a blade track segment made of ceramic matrix composite materials. The carrier segment may be arranged circumferentially at least partway around an axis. The blade track segment made of and supported by the carrier segment to locate the blade track segment radially outward of the axis.

In some embodiments, the carrier segment may include an outer wall, a forward support wall that extends radially inward from the outer wall, and an aft support wall axially that extends radially inward from the outer wall. The aft support wall may spaced apart axially from the forward support wall to define an attachment-receiving space axially between the forward and aft support walls.

In some embodiments, the blade track segment may include a shroud wall and an attachment feature. The shroud wall may extend circumferentially at least partway around the axis and axially between a forward shroud end and an aft shroud end spaced apart axially from the forward shroud end to define a portion of a gas path of the turbine assembly. The attachment feature may extend radially outward from the shroud wall axially between the forward and aft shroud ends into the attachment-receiving space of the carrier segment.

In some embodiments, the turbine vane may include an airfoil and a platform. The airfoil may extend radially across the gas path of the turbine assembly. The platform may extend circumferentially and axially away from the airfoil to define a portion of the gas path of the turbine assembly.

In some embodiments, the platform has an aft platform end. The aft platform end may be located adjacent at least a portion of the forward shroud end of the shroud wall and a portion of the forward support wall of the carrier segment to define a tortuous flow path therebetween. The tortuous flow path may be configured to reduce a flow of gases out of the gas path of the gas turbine engine.

In some embodiments, the tortuous flow path may have a first radial section, an angled section, and an axial section. The first radial section may extend radially from the gas path. The angled section may extend radially outward and axially forward from the first radial section. The axial section may extend axially forward from the angled section.

In some embodiments, the forward shroud end of the shroud wall may have a first radially-extending shroud surface, an angled shroud surface, and a second radially-extending shroud surface. The first radially-extending shroud surface may extend radially outward from an inner shroud surface of the shroud wall. The angled shroud surface may extend radially and axially forward from the first radially-extending shroud surface. The second radially-extending shroud surface may extend radially outward from the angled shroud surface toward an outer shroud surface of the shroud wall.

In some embodiments, the aft platform end of the turbine vane may have a first radially-extending platform surface, an angled platform surface, and an axially-extending platform surface. The first radially-extending platform surface may extend radially outward from an inner platform surface of the platform that defines the portion of the gas path. The angled platform surface may extend radially and axially forward from the first radially-extending platform surface, and an axially-extending platform surface that extends axially forward from the angled platform surface.

In some embodiments, the first radial section of the tortuous flow path may be defined between the first radially-extending shroud surface and the first radially-extending platform surface. The angled section of the tortuous flow path may be defined between the angled shroud surface and the angled platform surface. The axial section of the tortuous flow path may be defined between a portion of the forward support wall of the carrier segment and the axially-extending platform surface.

In some embodiments, the forward support wall may include a radially-extending member and a band. The radially-extending member may extend radially inward from the outer wall toward the shroud wall of the blade track segment. The band may extend radially inward from the radially-extending member along the second radially-extending shroud surface of the forward shroud end of the shroud wall toward the platform of the turbine vane.

In some embodiments, the aft platform end of the turbine vane may have a second radially-extending platform surface. The second radially-extending platform surface may extend radially outward from the axially-extending platform surface along the band of the forward support wall.

In some embodiments, the radially-extending member of the forward support wall may include a channel. The channel may extend circumferentially at least partway about the axis.

In some embodiments, the turbine shroud assembly may further comprise a seal member. The seal member may be arranged in the channel radially between the radially-extending member of the forward support wall and the outer shroud surface of the shroud wall of the blade track segment.

In some embodiments, the aft support wall may include a radially-extending member and an axial location feature. The radially-extending member may extend radially inward from the outer wall toward the shroud wall of the blade track segment. The axial location feature may extend axially forward from the radially-extending member and engages the attachment feature to axially locate the blade track segment relative to the carrier segment.

In some embodiments, the forward support wall may include a radially-extending member that extends radially inward from the outer wall toward the shroud wall of the blade track segment and a band that extends radially inward from the radially-extending member toward the platform of the turbine vane over another portion of the forward shroud end of the shroud wall. The tortuous flow path may be defined between the aft platform end of the platform, the band of the forward support wall, the portion of the forward shroud end of the shroud wall.

In some embodiments, the turbine shroud assembly may further comprise a seal member. The seal member may be arranged radially between the radially-extending member of the forward support wall and the shroud wall of the blade track segment.

In some embodiments, the radially-extending member of the forward support wall may include a channel. The channel may extend circumferentially at least partway about the axis. The seal member may be arranged in the channel.

In some embodiments, the turbine shroud assembly may further comprise. The retainer may extend axially through the attachment feature of the blade track segment into the forward and aft support walls of the carrier segment to couple the blade track segment to the carrier segment.

According to another aspect of the present disclosure, a turbine assembly adapted for use with a gas turbine engine may include a turbine shroud assembly and a turbine vane. The turbine vane may be located axially forward of the turbine shroud assembly.

In some embodiments, the turbine shroud assembly may include a carrier segment and a blade track segment. The carrier segment may be circumferentially at least partway around an axis. The carrier segment may be shaped to define an attachment-receiving space. The blade track segment may be coupled to the carrier segment.

In some embodiments, the blade track segment may include a shroud wall and an attachment feature. The shroud wall may extend circumferentially at least partway around the axis to define a portion of a gas path of the turbine assembly. The attachment feature may extend radially outward from the shroud wall into the attachment-receiving space of the carrier segment.

In some embodiments, the turbine vane may include an airfoil and a platform. The airfoil may extend radially across the gas path of the turbine assembly. The platform may extend circumferentially and axially away from the airfoil to define a portion of the gas path of the turbine assembly.

In some embodiments, the platform may have an aft platform end. The aft platform end may be located adjacent to the turbine shroud assembly to define a tortuous flow path therebetween. The tortuous flow path may be configured to reduce a flow of gases out of the gas path of the gas turbine engine.

In some embodiments, the tortuous flow path may have a first radial section, an angled section, and an axial section. The first radial section may extend radially from the gas path. The angled section may extend radially outward and axially forward from the first radial section. The axial section may extend axially forward from the angled section.

In some embodiments, the shroud wall of the blade track segment may extend axially between a forward shroud end and an aft shroud end spaced apart axially from the forward shroud end. The forward shroud end of the shroud wall may have a first radially-extending shroud surface that extends radially outward from an inner shroud surface of the shroud wall, an angled shroud surface that extends radially and axially forward from the first radially-extending shroud surface, and a second radially-extending shroud surface that extends radially outward from the angled shroud surface toward an outer shroud surface of the shroud wall.

In some embodiments, the aft platform end of the turbine vane may have a first radially-extending platform surface that extends radially outward from an inner platform surface of the platform that defines the portion of the gas path, an angled platform surface that extends radially and axially forward from the first radially-extending platform surface, and an axially-extending platform surface that extends axially forward from the angled platform surface. In some embodiments, the first radial section of the tortuous flow path may be defined between the first radially-extending shroud surface and the first radially-extending platform surface, the angled section of the tortuous flow path may be defined between the angled shroud surface and the angled platform surface, and the axial section of the tortuous flow path may be defined between a portion of the carrier segment and the axially-extending platform surface.

In some embodiments, the carrier segment may include an outer wall, a forward support wall that extends radially inward from the outer wall, and an aft support wall axially that extends radially inward from the outer wall. The aft support wall may be spaced apart axially from the forward support wall to define the attachment-receiving space.

In some embodiments, the forward support wall may include a radially-extending member and a band. The radially-extending member may extend radially inward from the outer wall toward the shroud wall of the blade track segment. The band may extend radially inward from the radially-extending member along the second radially-extending shroud surface of the forward shroud end of the shroud wall toward the platform of the turbine vane.

In some embodiments, the carrier segment may be formed to define a channel. The channel may extend circumferentially at least partway about the axis and opens toward the shroud wall of the blade track segment. The turbine shroud assembly may further comprise a seal member arranged in the channel.

In some embodiments, the carrier segment may include an outer wall, a forward support wall that extends radially inward from the outer wall, and an aft support wall axially that extends radially inward from the outer wall. The aft support wall may be spaced apart axially from the forward support wall to define the attachment-receiving space. The forward support wall may include a radially-extending member that extends radially inward from the outer wall toward the shroud wall of the blade track segment and a band that extends radially inward from the radially-extending member toward the platform of the turbine vane over another portion of a forward shroud end of the shroud wall. The tortuous flow path may be defined between the aft platform end of the platform, the band of the forward support wall, a portion of the forward shroud end of the shroud wall.

According to an aspect of the present disclosure, a method may include providing a blade track segment. The blade track segment may include a shroud wall, a first attachment flange, and a second attachment flange spaced apart axially from the first attachment flange. The shroud wall may be shaped to extend circumferentially partway around an axis and axially between a forward shroud end and an aft shroud end spaced apart axially from the forward shroud end to define a portion of a gas path. The first attachment flange may extend radially outward from the shroud wall. The second attachment flange may extend radially outward from the shroud wall.

In some embodiments, the method may further include providing a carrier segment. The carrier segment may include an outer wall, a first support wall that extends radially inward from the outer wall, and a second support wall spaced apart axially from the first support wall that extends radially inward from the outer wall.

In some embodiments, the method may further include providing a turbine vane. The turbine vane may include an airfoil and a platform. The airfoil may extend radially across the gas path. The platform may extend circumferentially and axial away from the airfoil.

In some embodiments, the method may further include arranging the blade track segment adjacent the carrier segment. The blade track segment may be arranged adjacent to the carrier segment so that the first attachment flange and the second attachment flange are located axially between the first support wall and the second support wall of the carrier segment.

In some embodiments, the method may further include coupling the blade track segment to the carrier segment. In some embodiments, the method may further include arranging the turbine vane axially forward of the assembled blade track segment and the carrier segment so that a portion of the platform of the turbine vane is located adjacent at least a portion of the forward shroud end of the shroud wall and a portion of the first support wall of the carrier segment to define a tortuous flow path therebetween. The tortuous flow path may be configured to reduce a flow of gasses out of the gas path.

These and other features of the present disclosure will become more apparent from the following description of the illustrative embodiments.

DETAILED DESCRIPTION OF THE DRAWINGS

Figure 1:
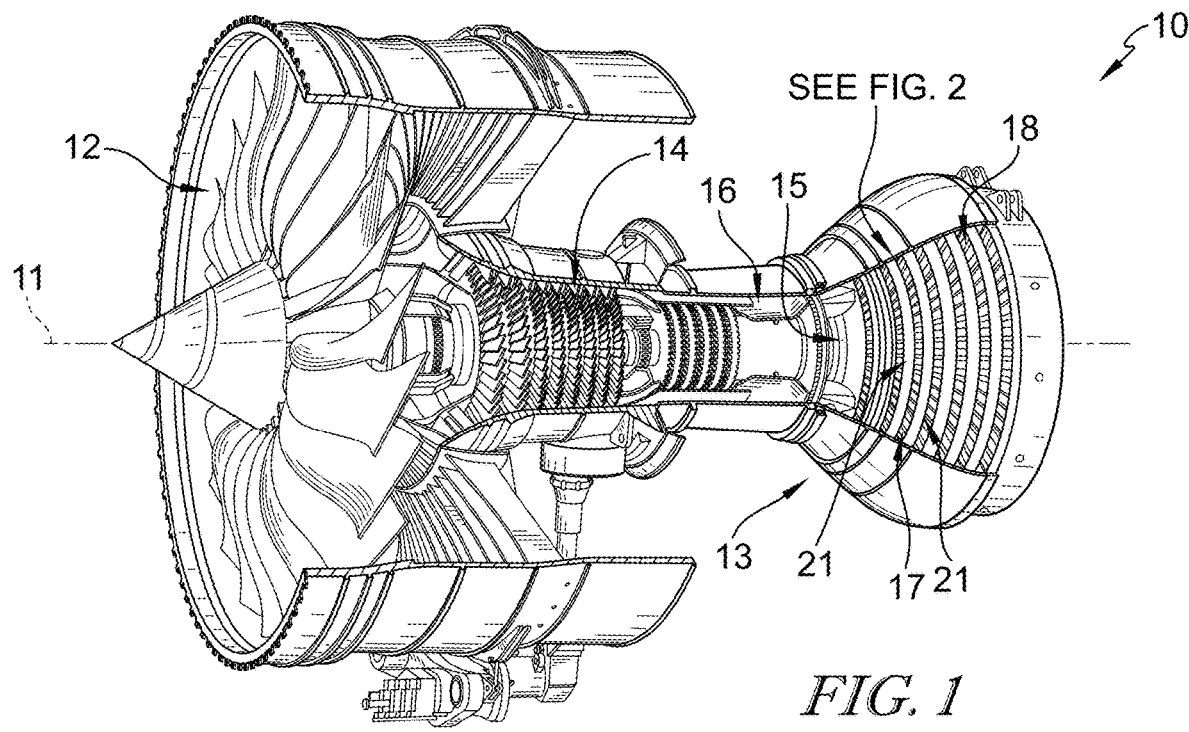
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine shroud assembly.

For the purposes of promoting an understanding of the principles of the disclosure, reference will now be made to a number of illustrative embodiments illustrated in the drawings and specific language will be used to describe the same.

Figure 2:
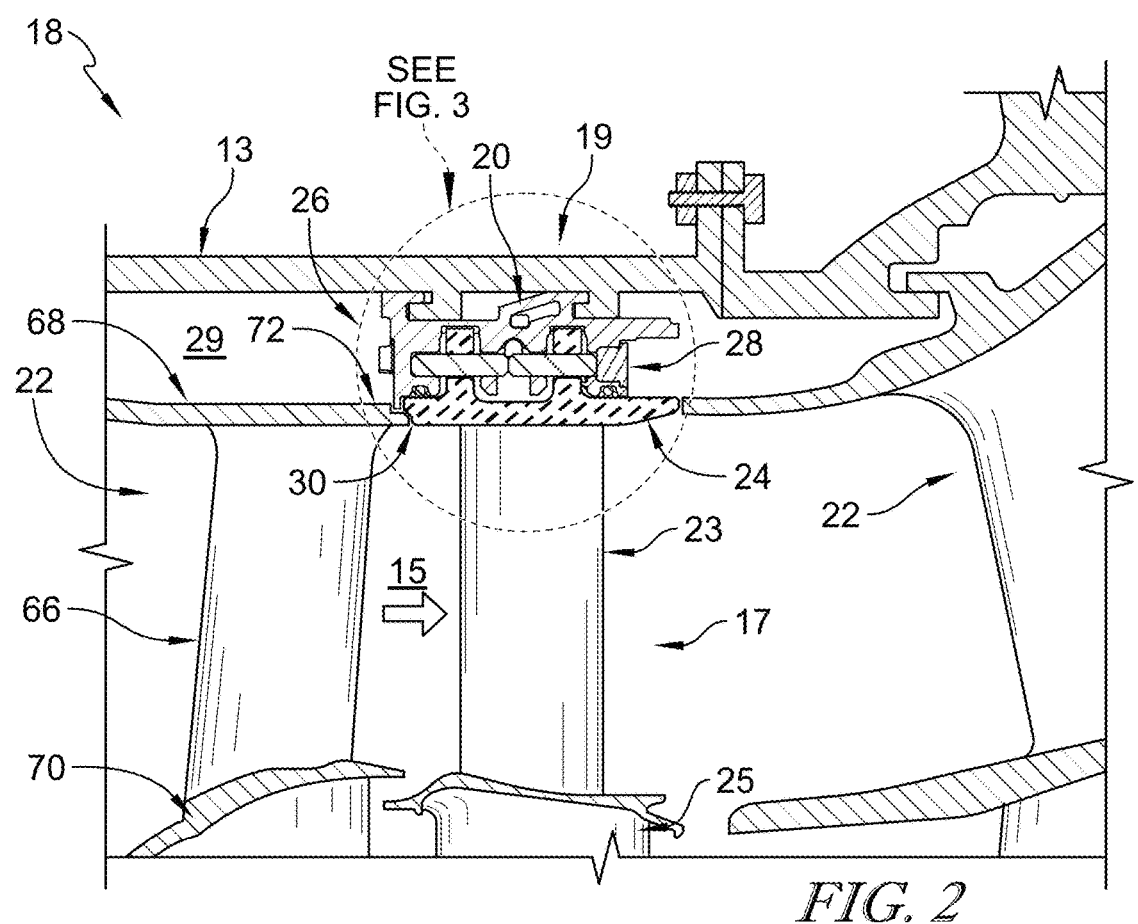
FIG. 2 is a partial cross-sectional view of the gas turbine engine of FIG. 1 showing a portion of the turbine in which the turbine shroud assembly is located radially outward from blades of a turbine wheel assembly to block gasses from passing over the blades without interacting with the blades and static turbine vanes is located axially forward of the turbine shroud assembly to direct the gasses into the downstream rotating turbine wheel assembly, further showing the turbine shroud assembly includes a blade track segment made from ceramic matrix composite materials, a carrier segment made of metallic materials, and a mount assembly that extends axially into the blade track segment and the carrier segment to couple the blade track segment to the carrier segment, and further showing the turbine vane includes inner platform, and outer platform, and an airfoil that extends radially between the inner and outer platforms.
Figure 3:
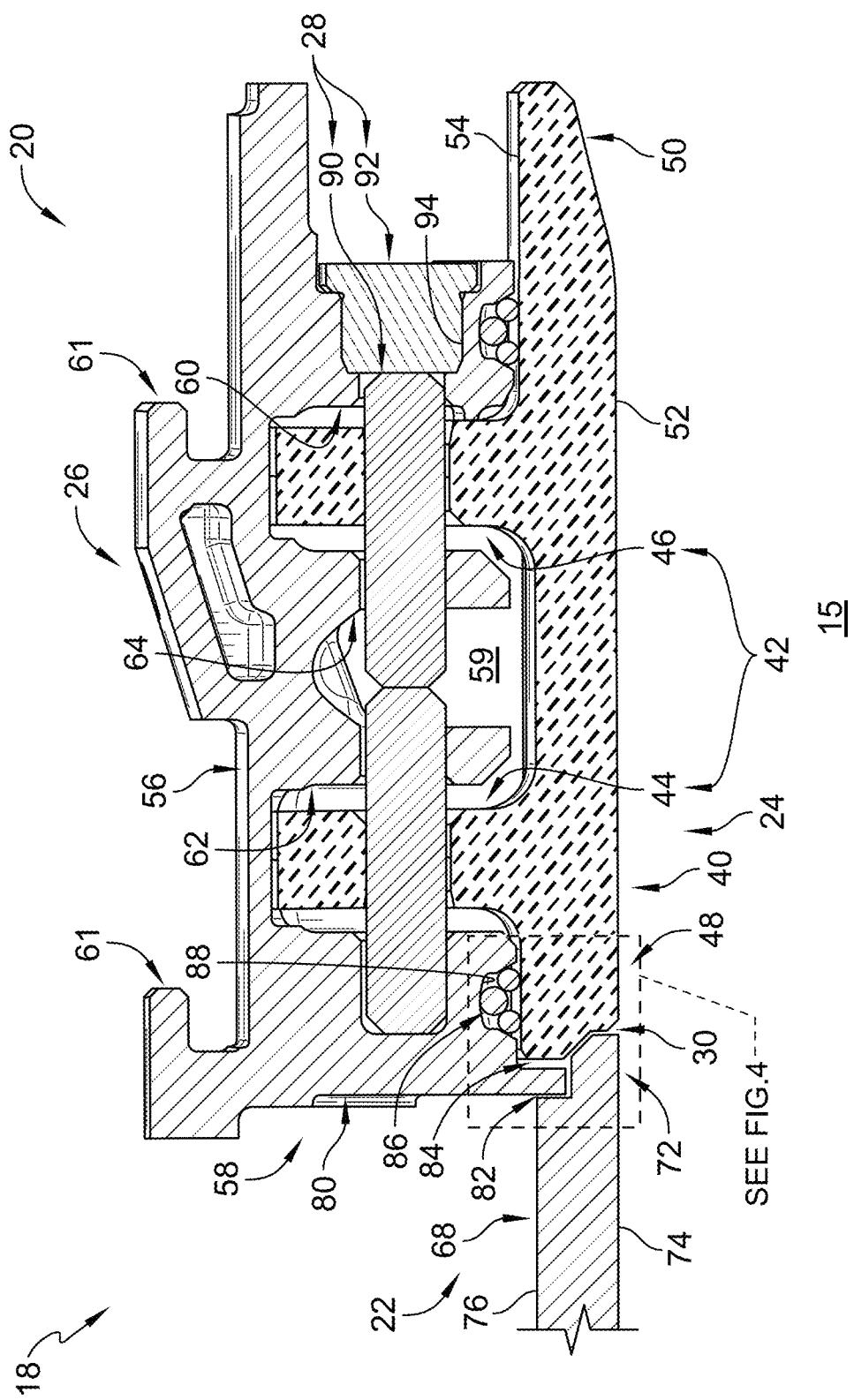
FIG. 3 is a detail view of the turbine assembly of FIG. 2 showing a portion of the outer platform of the upstream turbine vane extends toward and confronts the turbine shroud assembly to define a tortuous flow path therebetween to reduce leakage of gasses out of the gas path.
Figure 4:
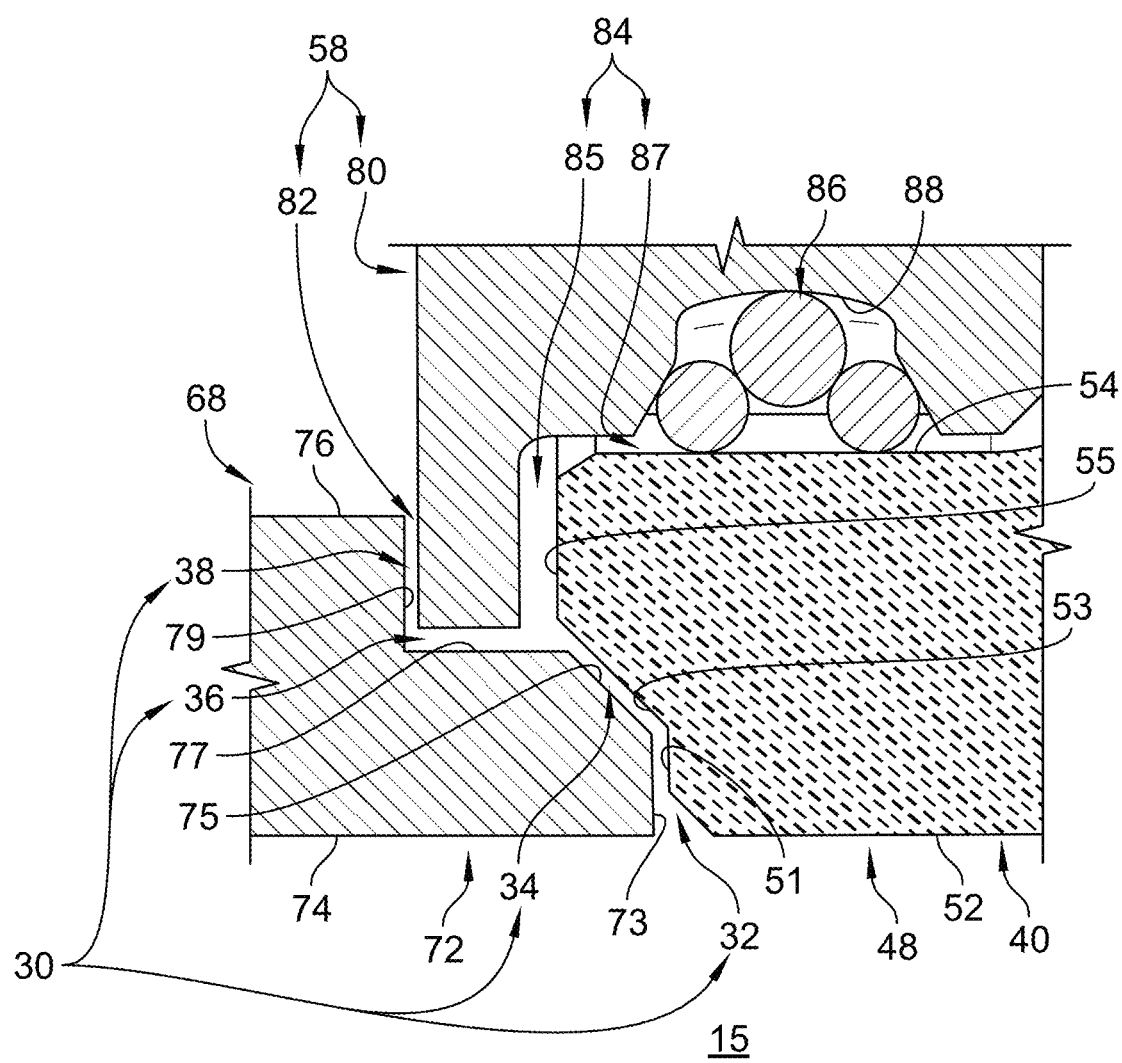
FIG. 4 is an detail of the turbine assembly of FIG. 3 showing the tortuous flow path has a first radial section defined between a first radially-extending shroud surface and a first radially-extending platform surface, an angled section defined between an angled shroud surface and an angled platform surface, and an axial section defined between a portion of the forward support wall of the carrier segment and an axially-extending platform surface, and a second radial section defined between a second radially-extending platform surface and the portion of the forward support wall of the carrier segment.

A turbine assembly 18 adapted for use in a gas turbine engine 10 is shown in FIGS. 2-4. The turbine assembly 18 includes a turbine shroud segment 20 and a turbine vane 22 located axially forward of the turbine shroud segment 20.

The turbine shroud segment 20 includes a blade track segment 24 made of ceramic matrix composite materials, a carrier segment 26 made of metallic materials, and a mount system 28 as shown in FIGS. 2-4. The blade track segment is arranged circumferentially at least partway around an axis 11 of the gas turbine engine 10. The blade track segment 24 is a ceramic matrix composite component configured to directly face the high temperatures of a gas path 15 of the gas turbine engine 10. The carrier segment 26 is arranged circumferentially at least partway around the axis 11. The mount system 28 configured to couple the blade track segment 24 to the carrier segment 26.

The turbine vane 22 includes an airfoil 66, an outer platform 68, and an inner platform 70 spaced apart radially from the outer platform 68 as shown in FIGS. 2-4. The airfoil 66 extends radially across the gas path 15 of the turbine section 18. The outer and inner platforms 68, 70 each extend away from the airfoil 66 to define a portion of the gas path 15 of the turbine assembly 18.

An aft platform end 72 of the outer platform 68 engages a forward end of the turbine shroud assembly 20 to form a tortuous flow path 30 therebetween as shown in FIGS. 2-4. The portion of the outer platform 68 of the turbine vane 22 extends away from the airfoil 66 toward the turbine shroud assembly 20 and confronts at least a portion of a forward shroud end 48 of a shroud wall 40 of the blade track segment 24 and a portion of a forward support wall 58 of the carrier segment 26 to define the tortuous flow path 30 therebetween. The tortuous flow path 30 is configured to reduce a flow of gases out of the gas path 15 of the gas turbine engine 10.

In the turbine 18 of the gas turbine engine 10, blade track segments and turbine vanes may be separate components that abut each other to form the gas path 15 of the gas turbine engine 10. Interfaces between components may create leakage paths for the combustion products of the gas path 15. The different assemblies having various components made of materials with different coefficients of thermal expansion may make it difficult to seal between the assemblies.

Therefore, the aft platform end 72 and the forward end of the turbine shroud assembly 20 cooperate to form the tortuous flow path 30. The tortuous flow path 30 is configured to reduce and/or limit a flow of combustion products out of the gas path 15. The tortuous flow path 30 has a first radial section 32, an angled section 34, an axial section 36, and a second radial section 38 as shown in FIG. 4. The first radial section 32 extends radially from the gas path 15. The angled section 34 extends radially outward and axially forward from the first radial section 32. The axial section 36 extends axially forward from the angled section 34. The second radial section 38 extends radially from the axial section 36.

The forward shroud end 48 of the shroud wall 40 included in the blade track segment 24 has a first radially-extending shroud surface 51, an angled shroud surface 53, and a second radially-extending shroud surface 55 as shown in FIG. 4. The first radially-extending shroud surface 51 extends radially outward from an inner shroud surface 52 of the shroud wall 40. The angled shroud surface 53 extends radially and axially forward from the first radially-extending shroud surface 51. The second radially-extending shroud surface 55 extends radially outward from the angled shroud surface 53 toward an outer shroud surface 54 of the shroud wall 40.

The aft platform end 72 of the outer platform 68 of the turbine vane 22 has a first radially-extending platform surface 73, an angled platform surface 75, an axially-extending platform surface 77, and a second radially-extending platform surface 79 as shown in FIG. 4. The first radially-extending platform surface 73 extends radially outward from an inner platform surface 74 of the outer platform 68 that defines the portion of the gas path 15. The angled platform surface 75 extends radially and axially forward from the first radially-extending platform surface 73. The axially-extending platform surface 77 extends axially forward from the angled platform surface 75. The second radially-extending platform surface 79 extends radially outward from the axially-extending platform surface 77 to an outer platform surface 76 of the outer platform 68.

The first radial section 32 of the tortuous flow path 30 is defined between the first radially-extending shroud surface 51 and the first radially-extending platform surface 73. The angled section 34 of the tortuous flow path 30 is defined between the angled shroud surface 53 and the angled platform surface 75. The axial section 36 of the tortuous flow path 30 is defined between a portion of a forward support wall 58 of the carrier segment 26 and the axially-extending platform surface 77. The second radial section 38 of the tortuous flow path 30 is defined between the second radially-extending platform surface 79 and the portion of the forward support wall 58 of the carrier segment 26.

In some embodiments, plenums 29 or cavities 59 located radially outward of the gas path 15, like as shown in FIGS. 2 and 3, may be supplied a flow of pressurized air to help further reduce or block leakage of combustion products in the gas path 15 through leakage paths between the different components. The pressurized air has a higher pressure that than the gases in the gas path 15 to help reduce or block flow into the tortuous flow path 30.

Turning again to the gas turbine engine 10, the gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

The turbine section 18 includes at least one turbine wheel assembly 17, a turbine shroud 19 positioned to surround the turbine wheel assembly 17, and a turbine vane assembly 21 as shown in FIGS. 1 and 2. The turbine wheel assembly 17 includes a plurality of blades 23 coupled to a rotor disk 25 for rotation with the disk 25. The hot, high pressure combustion products from the combustor 16 are directed toward the blades 23 of the turbine wheel assemblies 17 along the gas path 15. The turbine shroud 19 is coupled to an outer case 13 of the gas turbine engine 10 and extends around the turbine wheel assembly 17 to block gases from passing over the turbine blades 23 during use of the turbine section 18 in the gas turbine engine 10. The turbine vane assemblies 21 include turbine vanes 22 configured to direct the gasses into downstream rotating turbine wheel assemblies 17.

In the illustrative embodiment, the turbine shroud 19 is made up of a number of turbine shroud assemblies 20 that each extend circumferentially partway around the axis 11 and cooperate to surround the turbine wheel assembly 17. In other embodiments, the turbine shroud 19 is annular and non-segmented to extend fully around the central axis 11 and surround the turbine wheel assembly 17. In yet other embodiments, certain components of the turbine shroud 19 are segmented while other components are annular and non-segmented.

Each turbine shroud assembly 20 includes the blade track segment 24, the carrier segment 26, and the mount system 28 as shown in FIGS. 2-5. The blade track segment 24 and the carrier segment 26 are arranged circumferentially partway about the axis 11. The mount system 28 is configured to couple the blade track segment 24 to the carrier segment 26.

The blade track segment includes the shroud wall 40 and an attachment feature 42 as shown in FIGS. 2-5. The shroud wall 40 that extends circumferentially partway around the axis 11 and axially between a forward shroud end 48 and an aft shroud end 50 spaced apart axially from the forward shroud end 48. The attachment feature 42 includes a first attachment flange 44 and a second attachment flange 46 that each extend radially outward from the shroud wall 40 axially between the forward shroud end 48 and the aft shroud end 50. The second attachment flange 46 is spaced apart axially from the first attachment flange 44.

The forward shroud end 48 of the shroud wall 40 has the first radially-extending shroud surface 51, the angled shroud surface 53, and the second radially-extending shroud surface 55 as shown in FIG. 4. The first radially-extending shroud surface 51 extends radially outward from the inner shroud surface 52 of the shroud wall 40. The angled shroud surface 53 extends radially and axially forward from the first radially-extending shroud surface 51. The second radially-extending shroud surface 55 extends radially outward from the angled shroud surface 53 toward the outer shroud surface 54 of the shroud wall 40.

The carrier segment 26 includes an outer wall 56, a pair of hangers 61, a forward support wall 58, and an aft support wall 60 as shown in FIGS. 2-5. The outer wall extend circumferentially at least partway about the axis 11 radially outward of the attachment feature 42 of the blade track segment 24. The hangers 61 extend radially outward from the outer wall 56 and engage the case 17 to couple the turbine shroud segment 20 to the rest of the engine 10

The forward support wall 58 extends radially inward from the outer wall axially forward of the first attachment flange 44. The aft support wall 60 extends radially inward from the outer wall 56 axially aft of the second attachment flange 46. The aft support wall 60 is spaced apart axially from the forward support wall 58 to define an attachment-receiving space 59 axially between the forward and aft support walls 58, 60. The attachment-receiving space 59 may be pressurized with high-presser air to further help block leakage of combustion products in the gas path 15.

In the illustrative embodiment, the carrier segment 26 further includes a first intermediate support wall 62 and a second intermediate support wall 64 as shown in FIGS. 2-5. The first intermediate support wall 62 and the second intermediate support wall 64 each extend radially inward from the outer wall 56 of the carrier segment 26.

The first intermediate support wall 62 extends radially inward from the outer wall 56 axially aft of the first attachment flange 44 of the blade track segment 24 so that the first attachment flange 44 is located in a forward space between the forward support wall 58 and the first intermediate support wall 62. The second intermediate support wall 64 extends radially inward from the outer wall axially forward of the second attachment flange 46 of the blade track segment 24 so that the second attachment flange 46 is located in an aft space between the aft support wall 60 and the second intermediate support wall 64.

The forward support wall 58 includes a radially-extending member 80 and a band 82 as shown in FIGS. 3 and 4. The radially-extending member 80 extends radially inward from the outer wall 56 toward the shroud wall 40 of the blade track segment 24. The band 82 extends radially inward from the radially-extending member 80 along the second radially-extending shroud surface 55 of the forward shroud end 48 of the shroud wall 40 toward the platform 68 of the turbine vane 22. In the illustrative embodiment, the second radially-extending platform surface 79 of the aft platform end 72 extends radially outward from the axially-extending platform surface 77 along the band 82 of the forward support wall 58 to define the second radial section 38 of the tortuous flow path 30.

In the illustrative embodiment, the forward support wall 58 and a portion of the forward shroud end 48 of the shroud wall 40 define a passage 84 therebetween as shown in FIGS. 3 and 4. The passage 84 extends between the tortuous flow path 30 and the attachment-receiving space 59. In the illustrative embodiment, a seal member 86 included in the turbine shroud assembly 20 is arranged radially between the radially-extending member 80 of the forward support wall 58 and the outer shroud surface 54 of the shroud wall 40 of the blade track segment 24 to further restrict or block flow through the passage 84 and seal the attachment-receiving space 59 or cavity 59 defined by the carrier segment 26. In some embodiments, additional seals may be between the turbine shroud assembly 20 and the turbine vane 22 to further restrict or block flow through the tortuous flow path 30.

The radially-extending member 80 of the forward support wall 58 includes a channel 88 in the illustrative embodiment. The channel 88 extends circumferentially at least partway about the axis 11 and radially outward into the radially-extending member 80 as shown in FIGS. 3 and 4. The seal member 86 is arranged in the channel 88.

In the illustrative embodiment, the seal member 86 includes a combination of a rope seal and wire seals. In the some embodiments, the seal member 86 includes a plurality of rope seals. In some embodiments, the seal member 86 may include more than or less than three seal members like as shown in FIGS. 5 and 6. In other embodiments, another suitable seal member may be used.

In the illustrative embodiment, the passage 84 has a radial passage section 85 and an axial passage section 87 as shown in FIG. 4. The radial passage section 85 extends radially from tortuous flow path 30. In the illustrative embodiment, the radial passage section 85 extends radially from the axial section 36 of the tortuous flow path 30. The axial passage section 87 extends axially from the radial passage section 85 to the attachment-receiving space 59.

The radial passage section 85 is defined between the second radially-extending shroud surface 55 and the band 82 of the forward support wall 58. The axial passage section 87 is defined between the outer shroud surface 54 of the shroud wall 40 and the radially-extending member 80 of the forward support wall 58.

The aft support wall 60 includes a radially-extending member 96 and an axial location feature 98 as shown in FIGS. 3 and 4. The radially-extending member 96 extends radially inward from the outer wall 56 toward the shroud wall 40 of the blade track segment 24. The axial location feature 96, or chordal seal 96, extends axially forward from the radially-extending member 80 and engages the second attachment flange 46 of the attachment feature 42 to axially locate the blade track segment 24 relative to the carrier segment 26. The axial location feature 96 axially positions the blade track segment 24 relative to the carrier segment 26 to maintain the tortuous flow path 30 between the forward end 48 of the shroud wall 40 and the aft end 72 of the outer platform 68.

The mount system 28 includes at least one retainer 90, illustratively two retainers that each extend axially into the blade track segment 24 and the carrier segment 26 to couple the blade track segment 24 to the carrier segment 26. The retainers 90 are inserted into the carrier segment 26 through installation apertures 94 in the carrier segment 26. To block removal of the retainers 90, the mount system 28 further includes plugs 92 that are press fit into the corresponding installation aperture 94 aft of the retainers 90 to block removal of the retainers 90 through the installation apertures 94 in the carrier segment 26.

In the illustrative embodiment, the retainers 90 extend axially into the forward support wall 58, through the first attachment flange 44, the intermediate support walls 62, 64, and the second attachment flange 46, and into the aft support wall 60 of the carrier segment 26 so as to couple the blade track segment 24 to the carrier segment 26. Each of the retainer plugs 92 extends into the installation apertures 94 formed in the aft support wall 60 to block removal of the corresponding retainers 90 through the installation apertures 94.

In the illustrative embodiment, the retainers 90 are both split pins as shown in FIG. 3. Each retainer 90 includes a first pin and a second pin arranged axially aft of the first pin as shown in FIG. 3.

The turbine vane 22 includes an airfoil 66, an outer platform 68, and an inner platform 70 spaced apart radially from the outer platform 68 as shown in FIGS. 2-5. The airfoil 66 extends radially across the gas path 15 of the turbine section 18. The outer and inner platforms each extend away from the airfoil 66 to define a portion of the gas path 15 of the turbine assembly 18.

The aft platform end 72 of the outer platform 68 engages the turbine shroud assembly 20 as shown in FIGS. 2-5. The aft platform end 72 includes the first radially-extending platform surface 73, the angled platform surface 75, the axially-extending platform surface 77, and the second radially-extending platform surface 79 as shown in FIG. 4. The first radially-extending platform surface 73 extends radially outward from the inner platform surface 74 of the outer platform 68 that defines the portion of the gas path 15. The angled platform surface 75 extends radially and axially forward from the first radially-extending platform surface 73. The axially-extending platform surface 77 extends axially forward from the angled platform surface 75. The second radially-extending platform surface 79 extends radially outward from the axially-extending platform surface 77 to the outer platform surface 76 of the outer platform 68.

The tortuous flow path 30 is formed between the aft platform end 72, the band 82 of the forward support wall 58, the portion of the forward shroud end 48 of the shroud wall 40 as shown in FIG. 4. In the illustrative embodiment, the tortuous flow path 30 has the first radial section 32, the angled section 34, the axial section 36, and the second radial section 38 as shown in FIG. 4. In some embodiments, the tortuous flow path 30 may only have the first radial section 32, the angled section 34, and the axial section 36.

A method of assembling and using the turbine assembly 18 may include several steps. First, the method may begin by assembling the turbine shroud assembly 20. The method comprises arranging the blade track segment 24 adjacent the carrier segment 26 so that the first attachment flange 44 and the second attachment flange 46 are located axially between the first support wall 58 and the second support wall 60 of the carrier segment 26. Next, the retainers 90 may be inserted through the second support wall 60, through the second attachment flange 46, the first and second intermediate support wall 62, the first attachment flange 44, and into the first support wall 58 to couple the blade track segment 24 to the carrier segment. 26. The plug 92 may be inserted into the installation aperture 94 to block removal of the retainer 90.

Next, the method comprises arranging the turbine vane 22 axially forward of the assembled blade track segment 24 and the carrier segment 26 so that the aft platform end 72 of the platform 68 of the turbine vane 22 is located adjacent at least a portion of the forward shroud end 48 of the shroud wall 40 and a portion of the first support wall 58 of the carrier segment 26 so as to define the tortuous flow path 30 therebetween. The method may further comprises providing a flow of pressurized air to the tortuous flow path 30 to further help restrict or block combustion products from leaking out of the gas path 15.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly adapted for use with a gas turbine engine, the turbine assembly comprising
    a turbine shroud assembly comprising:
        a carrier segment made of metallic materials and arranged circumferentially at least partway around an axis, the carrier segment having an outer wall, a forward support wall that extends radially inward from the outer wall, and an aft support wall axially that extends radially inward from the outer wall, the aft support wall spaced apart axially from the forward support wall to define an attachment-receiving space axially between the forward and aft support walls,
        a blade track segment made of ceramic matrix composite materials and supported by the carrier segment to locate the blade track segment radially outward of the axis, the blade track segment including a shroud wall that extends circumferentially at least partway around the axis and axially between a forward shroud end and an aft shroud end spaced apart axially from the forward shroud end to define a portion of a gas path of the turbine assembly and an attachment feature that extends radially outward from the shroud wall axially between the forward and aft shroud ends into the attachment-receiving space of the carrier segment, and
    a turbine vane located axially forward of the turbine shroud assembly, the turbine vane including an airfoil that extends radially across the gas path of the turbine assembly and a platform that extends circumferentially and axially away from the airfoil to define a portion of the gas path of the turbine assembly,
    wherein the platform has an aft platform end that is located adjacent at least a portion of the forward shroud end of the shroud wall and a portion of the forward support wall of the carrier segment to define a tortuous flow path therebetween and the tortuous flow path configured to reduce a flow of gases out of the gas path of the gas turbine engine, and
    wherein the tortuous flow path has a first radial section that extends radially outward from the gas path, an angled section that extends radially outward and axially forward from the first radial section, and an axial section that extends axially forward from the angled section.

2. The turbine assembly of claim 1, wherein the forward shroud end of the shroud wall has a first radially-extending shroud surface that extends radially outward from an inner shroud surface of the shroud wall, an angled shroud surface that extends radially and axially forward from the first radially-extending shroud surface, and a second radially-extending shroud surface that extends radially outward from the angled shroud surface toward an outer shroud surface of the shroud wall,
    wherein the aft platform end of the turbine vane has a first radially-extending platform surface that extends radially outward from an inner platform surface of the platform that defines the portion of the gas path, an angled platform surface that extends radially and axially forward from the first radially-extending platform surface, and an axially-extending platform surface that extends axially forward from the angled platform surface, and
    wherein the first radial section of the tortuous flow path is defined between the first radially-extending shroud surface and the first radially-extending platform surface, the angled section of the tortuous flow path is defined between the angled shroud surface and the angled platform surface, and the axial section of the tortuous flow path is defined between a portion of the forward support wall of the carrier segment and the axially-extending platform surface.

3. The turbine assembly of claim 2, wherein the forward support wall includes a radially-extending member that extends radially inward from the outer wall toward the shroud wall of the blade track segment and a band that extends radially inward from the radially-extending member along the second radially-extending shroud surface of the forward shroud end of the shroud wall toward the platform of the turbine vane.

4. The turbine assembly of claim 3, wherein the aft platform end of the turbine vane has a second radially-extending platform surface that extends radially outward from the axially-extending platform surface along the band of the forward support wall.

5. The turbine assembly of claim 3, wherein the radially-extending member of the forward support wall includes a channel that extends circumferentially at least partway about the axis, and wherein the turbine shroud assembly further comprises a seal member arranged in the channel radially between the radially-extending member of the forward support wall and the outer shroud surface of the shroud wall of the blade track segment.

6. The turbine assembly of claim 2, wherein the aft support wall includes a radially-extending member that extends radially inward from the outer wall toward the shroud wall of the blade track segment and an axial location feature that extends axially forward from the radially-extending member and engages the attachment feature to axially locate the blade track segment relative to the carrier segment.

7. The turbine assembly of claim 1, wherein the forward support wall includes a radially-extending member that extends radially inward from the outer wall toward the shroud wall of the blade track segment and a band that extends radially inward from the radially-extending member toward the platform of the turbine vane over another portion of the forward shroud end of the shroud wall, and
wherein the tortuous flow path is defined between the aft platform end of the platform, the band of the forward support wall, the portion of the forward shroud end of the shroud wall.

8. The turbine assembly of claim 7, wherein the turbine shroud assembly further comprises a seal member arranged radially between the radially-extending member of the forward support wall and the shroud wall of the blade track segment.

9. The turbine assembly of claim 8, wherein the radially-extending member of the forward support wall includes a channel that extends circumferentially at least partway about the axis and the seal member is arranged in the channel.

10. The turbine assembly of claim 8, wherein the turbine shroud assembly further comprises a retainer that extends axially through the attachment feature of the blade track segment into the forward and aft support walls of the carrier segment to couple the blade track segment to the carrier segment.

11. The turbine assembly of claim 1, wherein the turbine shroud assembly further comprises a seal member arranged radially between the forward support wall and the shroud wall of the blade track segment, and wherein the seal member is located radially outward of the tortuous flow path.

12. The turbine assembly of claim 1, wherein the forward support wall and a portion of the forward shroud end of the shroud wall define a passage therebetween that extends between the tortuous flow path and the attachment-receiving space, and wherein the turbine shroud assembly further comprises a seal member arranged radially between the forward support wall and the shroud wall of the blade track segment to further restrict or block flow through the passage and seal the attachment-receiving space.

13. The turbine assembly of claim 12, wherein the passage has a radial passage that extends radially outward from tortuous flow path and an axial passage section that extends axially from the radial passage section to the attachment-receiving space.

14. The turbine assembly of claim 13, wherein the forward support wall includes a radially-extending member that extends radially inward from the outer wall toward the shroud wall of the blade track segment and a band that extends radially inward from the radially-extending member toward the platform of the turbine vane over another portion of the forward shroud end of the shroud wall, and
wherein the tortuous flow path is defined between the aft platform end of the platform, the band of the forward support wall, the portion of the forward shroud end of the shroud wall.

15. A turbine assembly adapted for use with a gas turbine engine, the turbine assembly comprising
a turbine shroud assembly comprising:
a carrier segment arranged circumferentially at least partway around an axis, the carrier segment shaped to define an attachment-receiving space, and
a blade track segment coupled to the carrier segment, the blade track segment including a shroud wall that extends circumferentially at least partway around the axis to define a portion of a gas path of the turbine assembly and an attachment feature that extends radially outward from the shroud wall into the attachment-receiving space of the carrier segment, and
a turbine vane located axially forward of the turbine shroud assembly, the turbine vane including an airfoil that extends radially across the gas path of the turbine assembly and a platform that extends circumferentially and axially away from the airfoil to define a portion of the gas path of the turbine assembly,
wherein the platform has an aft platform end that is located adjacent to the turbine shroud assembly to define a tortuous flow path therebetween and the tortuous flow path configured to reduce a flow of gases out of the gas path of the gas turbine engine,
wherein the tortuous flow path has a first radial section that extends radially from the gas path, an angled section that extends radially outward and axially forward from the first radial section, and an axial section that extends axially forward from the angled section,
wherein the shroud wall of the blade track segment extends axially between a forward shroud end and an aft shroud end spaced apart axially from the forward shroud end, the forward shroud end of the shroud wall having a first radially-extending shroud surface that extends radially outward from an inner shroud surface of the shroud wall, an angled shroud surface that extends radially and axially forward from the first radially-extending shroud surface, and a second radially-extending shroud surface that extends radially outward from the angled shroud surface toward an outer shroud surface of the shroud wall,
wherein the aft platform end of the turbine vane has a first radially-extending platform surface that extends radially outward from an inner platform surface of the platform that defines the portion of the gas path, an angled platform surface that extends radially and axially forward from the first radially-extending platform surface, and an axially-extending platform surface that extends axially forward from the angled platform surface, and wherein the first radial section of the tortuous flow path is defined between the first radially-extending shroud surface and the first radially-extending platform surface, the angled section of the tortuous flow path is defined between the angled shroud surface and the angled platform surface, and the axial section of the tortuous flow path is defined between a portion of the carrier segment and the axially-extending platform surface.

16. The turbine assembly of claim 15, wherein the carrier segment includes an outer wall, a forward support wall that extends radially inward from the outer wall, and an aft support wall axially that extends radially inward from the outer wall, the aft support wall spaced apart axially from the forward support wall to define the attachment-receiving space, and
  wherein the forward support wall includes a radially-extending member that extends radially inward from the outer wall toward the shroud wall of the blade track segment and a band that extends radially inward from the radially-extending member along the second radially-extending shroud surface of the forward shroud end of the shroud wall toward the platform of the turbine vane.

17. The turbine assembly of claim 15, wherein the carrier segment is formed to define a channel that extends circumferentially at least partway about the axis and opens toward the shroud wall of the blade track segment, and wherein the turbine shroud assembly further comprises a seal member arranged in the channel.

18. The turbine assembly of claim 15, wherein the carrier segment includes an outer wall, a forward support wall that extends radially inward from the outer wall, and an aft support wall axially that extends radially inward from the outer wall, the aft support wall spaced apart axially from the forward support wall to define the attachment-receiving space, and
  wherein the forward support wall includes a radially-extending member that extends radially inward from the outer wall toward the shroud wall of the blade track segment and a band that extends radially inward from the radially-extending member toward the platform of the turbine vane over another portion of a forward shroud end of the shroud wall, and
  wherein the tortuous flow path is defined between the aft platform end of the platform, the band of the forward support wall, a portion of the forward shroud end of the shroud wall.

19. A method comprising
  providing a blade track segment including a shroud wall shaped to extend circumferentially partway around an axis and axially between a forward shroud end and an aft shroud end spaced apart axially from the forward shroud end to define a portion of a gas path, a first attachment flange that extends radially outward from the shroud wall, and a second attachment flange spaced apart axially from the first attachment flange that extends radially outward from the shroud wall,
  providing a carrier segment including an outer wall, a first support wall that extends radially inward from the outer wall, and a second support wall spaced apart axially from the first support wall that extends radially inward from the outer wall,
  providing a turbine vane including an airfoil that extends radially across the gas path and a platform that extends circumferentially and axial away from the airfoil,
  providing a retainer,
  providing a seal member,
  arranging the seal member in a channel formed in the first support wall of the carrier segment,
  arranging the blade track segment adjacent the carrier segment so that the first attachment flange and the second attachment flange are located axially between the first support wall and the second support wall of the carrier segment and the seal is located radially between the first support wall of the carrier segment and the shroud wall of the blade track segment,
  coupling the blade track segment to the carrier segment by inserting the retainer axially through the second support wall, the second attachment flange of the blade track segment, and the first attachment feature of the blade track segment and into the first support wall of the carrier segment, and
  arranging the turbine vane axially forward of the assembled blade track segment and the carrier segment so that a portion of the platform of the turbine vane is located adjacent at least a portion of the forward shroud end of the shroud wall and a portion of the first support wall of the carrier segment to define a tortuous flow path therebetween configured to reduce a flow of gases out of the gas path,
  wherein the tortuous flow path has a first radial section that extends radially outward from the gas path, an angled section that extends radially outward and axially forward from the first radial section, and an axial section that extends axially forward from the angled section and wherein the seal member is located radially outward of the tortuous flow path.

20. The method of claim 19, wherein the shroud wall of the blade track segment extends axially between a forward shroud end and an aft shroud end spaced apart axially from the forward shroud end, the forward shroud end of the shroud wall having a first radially-extending shroud surface that extends radially outward from an inner shroud surface of the shroud wall, an angled shroud surface that extends radially and axially forward from the first radially-extending shroud surface, and a second radially-extending shroud surface that extends radially outward from the angled shroud surface toward an outer shroud surface of the shroud wall,
  wherein the aft platform end of the turbine vane has a first radially-extending platform surface that extends radially outward from an inner platform surface of the platform that defines the portion of the gas path, an angled platform surface that extends radially and axially forward from the first radially-extending platform surface, and an axially-extending platform surface that extends axially forward from the angled platform surface, and
  wherein the first radial section of the tortuous flow path is defined between the first radially-extending shroud surface and the first radially-extending platform surface, the angled section of the tortuous flow path is defined between the angled shroud surface and the angled platform surface, and the axial section of the tortuous flow path is defined between a portion of the carrier segment and the axially-extending platform surface.

* * * * *